(12) United States Patent
Ichihara et al.

(10) Patent No.: US 7,007,781 B2
(45) Date of Patent: Mar. 7, 2006

(54) ONE-WAY CLUTCH UNIT AND ONE-WAY CLUTCH THEREFOR

(75) Inventors: Takahiro Ichihara, Kashiwara (JP); Hajime Watanabe, Kashiwara (JP); Hideki Fujiwara, Nara (JP); Minoru Mera, Kariya (JP); Taku Adaniya, Kariya (JP); Akinobu Kanai, Kariya (JP); Naoki Usui, Kariya (JP); Tomoharu Arai, Kariya (JP)

(73) Assignee: Koyo Seiko Co., Ltd., Osaka (JP)

( * ) Notice: Subject to any disclaimer, the term of this patent is extended or adjusted under 35 U.S.C. 154(b) by 41 days.

(21) Appl. No.: 10/786,165

(22) Filed: Feb. 26, 2004

(65) Prior Publication Data

US 2004/0178039 A1 Sep. 16, 2004

(30) Foreign Application Priority Data

Feb. 28, 2003 (JP) .............................. 2003-053777

(51) Int. Cl.
F16D 41/06 (2006.01)
(52) U.S. Cl. .................. 192/48.92; 192/45; 192/110 B
(58) Field of Classification Search ................. 192/45, 192/45.1, 48.91, 48.92, 110 B
See application file for complete search history.

(56) References Cited

U.S. PATENT DOCUMENTS

2002/0157413 A1 10/2002 Iwanami et al.
2003/0000792 A1 * 1/2003 Fujiwara ....................... 192/45
2003/0098186 A1 * 5/2003 Murakami et al. .......... 180/65.2
2003/0098216 A1 * 5/2003 Hayashi .................... 192/48.92
2003/0103848 A1 * 6/2003 Hayashi ...................... 417/212
2003/0126870 A1 7/2003 Meckstroth et al.
2003/0194263 A1 * 10/2003 Ueda et al. ..................... 403/2
2003/0200759 A1 10/2003 Iwanami et al.
2004/0178040 A1 * 9/2004 Ichihara et al. .......... 192/48.92
2004/0180742 A1 * 9/2004 Ichihara et al. ................ 474/70

FOREIGN PATENT DOCUMENTS

| DE | 102 18 083 A1 | 11/2002 |
| DE | 103 17 522 A1 | 11/2003 |
| JP | 05060153 A * | 3/1993 |
| JP | 2001140757 | 5/2001 |

* cited by examiner

Primary Examiner—Richard M. Lorence
(74) Attorney, Agent, or Firm—Nixon & Vanderhye, P.C.

(57) ABSTRACT

There is provided a compact one-way clutch unit that can perform connection and disconnection of power in two systems. An end portion on a side of a deep groove ball bearing portion 65 of a second one-way clutch 2 is disposed in an annular recess 67, which is provided at an end portion in an inner peripheral surface of a first inner ring 7, so that the dimension in an axial direction of a one-way clutch unit is reduced. Further, an outer peripheral diameter on a side of the deep groove ball bearing portion 65 is made smaller than that on the side of a one-way clutch portion 60 of a second outer ring 14 so as to reduce a diameter of the recess 67 and the outer peripheral diameter of the first outer ring 5 of the first one-way clutch 1.

1 Claim, 2 Drawing Sheets

ONE-WAY CLUTCH UNIT AND ONE-WAY CLUTCH THEREFOR

BACKGROUND OF THE INVENTION

The present invention relates to a one-way clutch unit which is convenient if used for connection and disconnection of power between, for example, an automobile engine and an air conditioner as well as a one-way clutch therefor.

Conventionally, as a power transmission device used for connection and disconnection of power between an automobile engine and an air conditioner, there is a device in which an electromagnetic clutch is provided between a pulley and a rotating shaft that drives a compressor. The electromagnetic clutch is turned on while the engine is rotating so that a rotational power is transmitted to the rotating shaft from the pulley. On the other hand, the electromagnetic clutch is turned off when the engine is stopped to disconnect the rotating shaft from the pulley, so that the rotating shaft is driven to rotate by a motor.

However, the conventional power transmission device requires an electromagnetic clutch and a control part that controls on-off action of the electromagnetic clutch. This makes the structure of the power transmission device complicated and increases the device size.

SUMMARY OF THE INVENTION

It is an object of the present invention to provide a one-way clutch unit that allows a power transmission device to be simple in structure and small in size as well as a one-way clutch usable therefor.

In order to achieve the above object, a one-way clutch unit of the present invention comprises:

a first one-way clutch including a first outer ring having in an inner periphery thereof an engagement surface and a raceway surface which are adjacent to each other, a first inner ring having in an outer periphery thereof an engagement surface and a raceway surface which are adjacent to each other, first engagement members disposed between the engagement surface of the first outer ring and the engagement surface of the first inner ring, and first rolling members disposed between the raceway surface of the first outer ring and the raceway surface of the first inner ring; and a second one-way clutch including a second outer ring having in an inner periphery thereof an engagement surface and a raceway surface which are adjacent to each other, a second inner ring having in an outer periphery thereof an engagement surface and a raceway surface which are adjacent to each other, second engagement members disposed between the engagement surface of the second outer ring and the engagement surface of the second inner ring, and second rolling members disposed between the raceway surface of the second outer ring and the raceway surface of the second inner ring; wherein an outer diameter of a portion on a side of the raceway surface in an outer peripheral surface of the second outer ring of the second one-way clutch is smaller than an outer diameter of a portion on a side of the engagement surface in the outer peripheral surface of the second outer ring; wherein an annular recess is provided in an inner periphery of the first inner ring of the first one-way clutch; and wherein one end portion on the side of the raceway surface in the second one-way clutch is disposed in the annular recess.

In the one-way clutch unit of the present invention, for example, suppose that the first outer ring of the first one-way clutch is connected to a pulley driven by an engine, that the second outer ring of the second one-way clutch is connected to a rotor of a motor, and that the first inner ring of the first one-way clutch and the second inner ring of the second one-way clutch are connected to a rotating shaft of the compressor. Then, while the engine is operating, a rotational power of the pulley driven by the engine is transmitted to the rotating shaft of the compressor via the first outer ring, first engagement members and first inner ring of the first one-way clutch, so that the rotating shaft of the compressor is rotated by the engine. During the operation of the engine, the second one-way clutch is in a disengaged state, and the second inner ring of the second one-way clutch freely rotates. On the other hand, while the engine is not operating, the motor is driven so that the rotational power of the rotor of the motor is transmitted to the rotating shaft of the compressor via the second outer ring, second engagement members and second inner ring of the second one-way clutch, whereby the rotating shaft of the compressor is rotated by the motor. While the engine is not operating, the first one-way clutch is in a disengaged state, and the first inner ring freely rotates or idles.

With the use of the one-way clutch unit of the invention, the rotating shaft of the compressor can be driven by the engine and the motor without any need for an electromagnetic clutch or a control part therefor, thus enabling the power transmission device to be simple in structure and compact.

According to the one-way clutch unit of the invention, the outer diameter of the portion on the side of the raceway surface in the outer peripheral surface of the second outer ring of the second one-way clutch is smaller than that on the side of the engagement surface in the outer peripheral surface of the second outer ring, and the end portion on the side of the raceway surface of the second one-way clutch is disposed in the annular recess of the first inner ring of the first one-way clutch. Thus, the dimension in an axial direction of the overall one-way clutch unit can be reduced by a dimension in the axial direction of the end portion of the second one-way clutch that is disposed in the recess.

Further, because the outer peripheral diameter of the end portion on the side of the raceway surface of the second outer ring of the second one-way clutch, which end portion is disposed in the recess of the first inner ring of the first one-way clutch, is made smaller than that on the side of the engagement surface of the second outer ring, an inner peripheral diameter of the annular recess of the first inner ring can be made smaller. Therefore, even if the outer peripheral diameter of the first inner ring on the side where the annular recess is provided is not increased, the thickness of the first inner ring can be secured. Accordingly, there is no need for increasing the dimension in the radial direction of the first one-way clutch and the dimension in a radial direction of the one-way clutch unit can be reduced. In this manner, the dimensions in both the axial and radial directions of the one-way clutch unit can be reduced, and thus the one-way clutch unit can be made compact.

According to the one-way clutch unit of the present invention, the outer diameter of the portion on the side of the raceway surface in the outer peripheral surface of the second outer ring of the second one-way clutch is smaller than that on the side of the engagement surface in the outer peripheral surface of the second outer ring. Thus, even if the second engagement members are larger than the second rolling members and then an inner diameter of the engagement surface of the second outer ring is larger than that of the raceway surface of the second outer ring, a difference in thickness between the portion on the side of the engagement surface of the second outer ring and the portion on the side of the raceway surface of the second outer ring can be reduced. Therefore, when the second outer ring is produced by cold forging, the occurrence of an expansion in conical shape of opening at an end portion on the side of the engagement surface of the second outer ring can be prevented. If the outer peripheral diameter on the side of the raceway surface of the second outer ring is made equal to that on the side of the engagement surface of the second outer ring of the second one-way clutch, the thickness on the side of the engagement surface of the second outer ring is smaller than that on the side of the raceway surface of the second outer ring, so that an expansion in conical shape of opening occurs on the side of the engagement surface of the second outer ring when the second outer ring is produced by cold forging, resulting in deterioration of engagement performance of the second one-way clutch.

A one-way clutch of the present invention comprises:

an outer ring having in an inner periphery thereof an engagement surface and a raceway surface which are adjacent to each other;

an inner ring having in an outer periphery thereof an engagement surface and a raceway surface which are adjacent to each other;

engagement members disposed between the engagement surface of the outer ring and the engagement surface of the inner ring; and rolling members disposed between the raceway surface of the outer ring and the raceway surface of the inner ring; wherein an outer diameter of a portion on a side of the raceway surface in an outer peripheral surface of the outer ring is smaller than an outer diameter of a portion on a side of the engagement surface in the outer peripheral surface of the outer ring.

According to the one-way clutch of the present invention, the outer peripheral diameter on the side of the raceway surface of the outer ring is made smaller than that on the side of the engagement surface of the outer ring of the one-way clutch. Thus, even if the engagement members are larger than the rolling members and an inner diameter of the engagement surface of the outer ring is larger than that of a raceway surface of the outer ring thereof, a difference in thickness between the side of the engagement surface of the outer ring and the side of the raceway surface of the outer ring can be reduced. Accordingly, the engagement performance of the one-way clutch can be improved.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will hereinafter be described in more detail by an embodiment illustrated.

Figure 1:
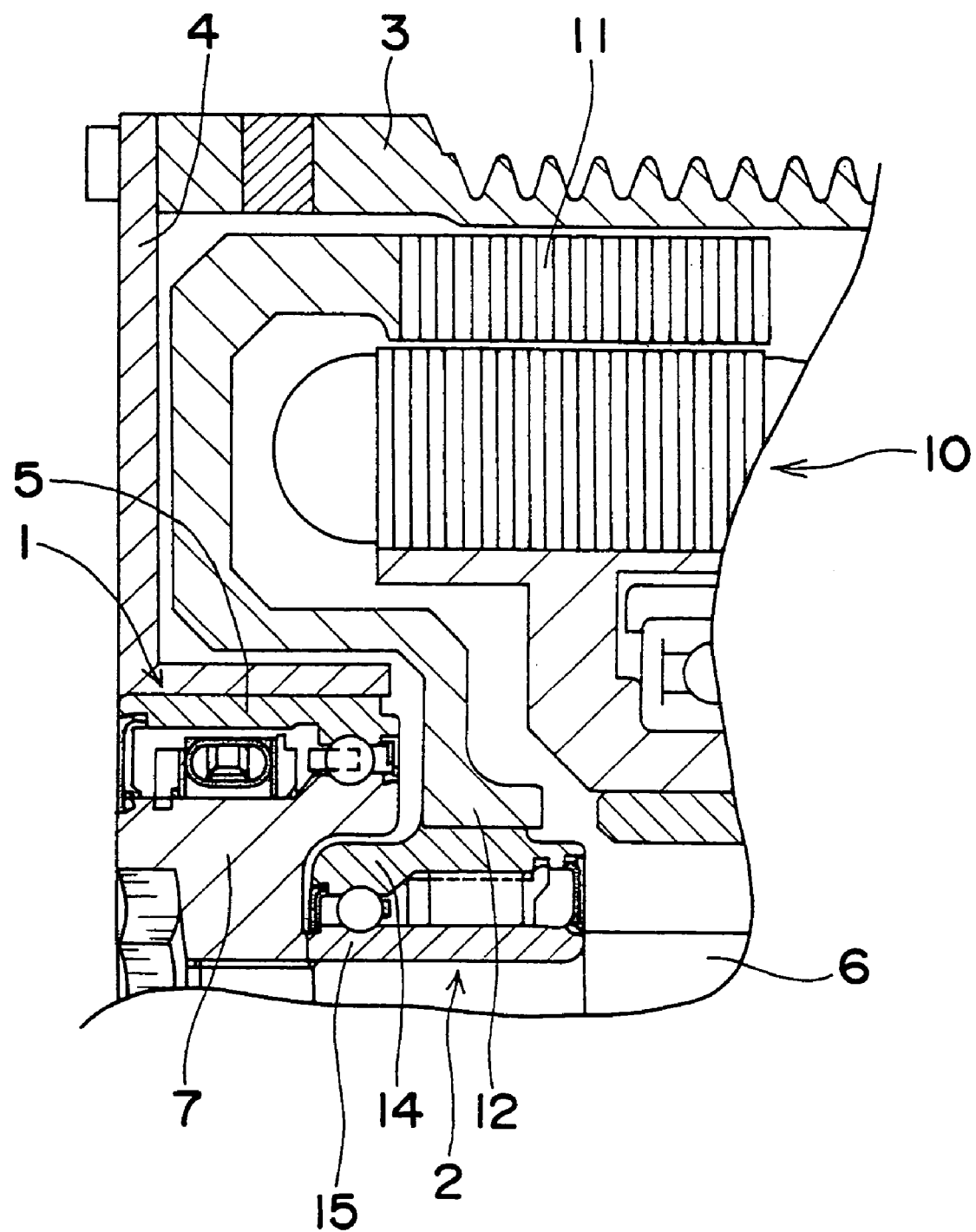
FIG. 1 is a cross section of a power transmission device including one embodiment of a one-way clutch unit of the present invention.

FIG. 1 is a cross section of a power transmission device including one embodiment of a one-way clutch unit of the invention.

The one-way clutch unit is comprised of a first one-way clutch 1 and a second one-way clutch 2.

While an engine not shown is in operation, a rotational power of a pulley 3 driven by this engine is transmitted to a rotating shaft 6 of a compressor not shown via a first power transmission member 4 and the first one-way clutch 1. On the other hand, when the engine is stopped, a rotational power of a rotor 11 of a motor 10 is transmitted to the rotating shaft 6 of the compressor via the second one-way clutch 2.

Figure 2:
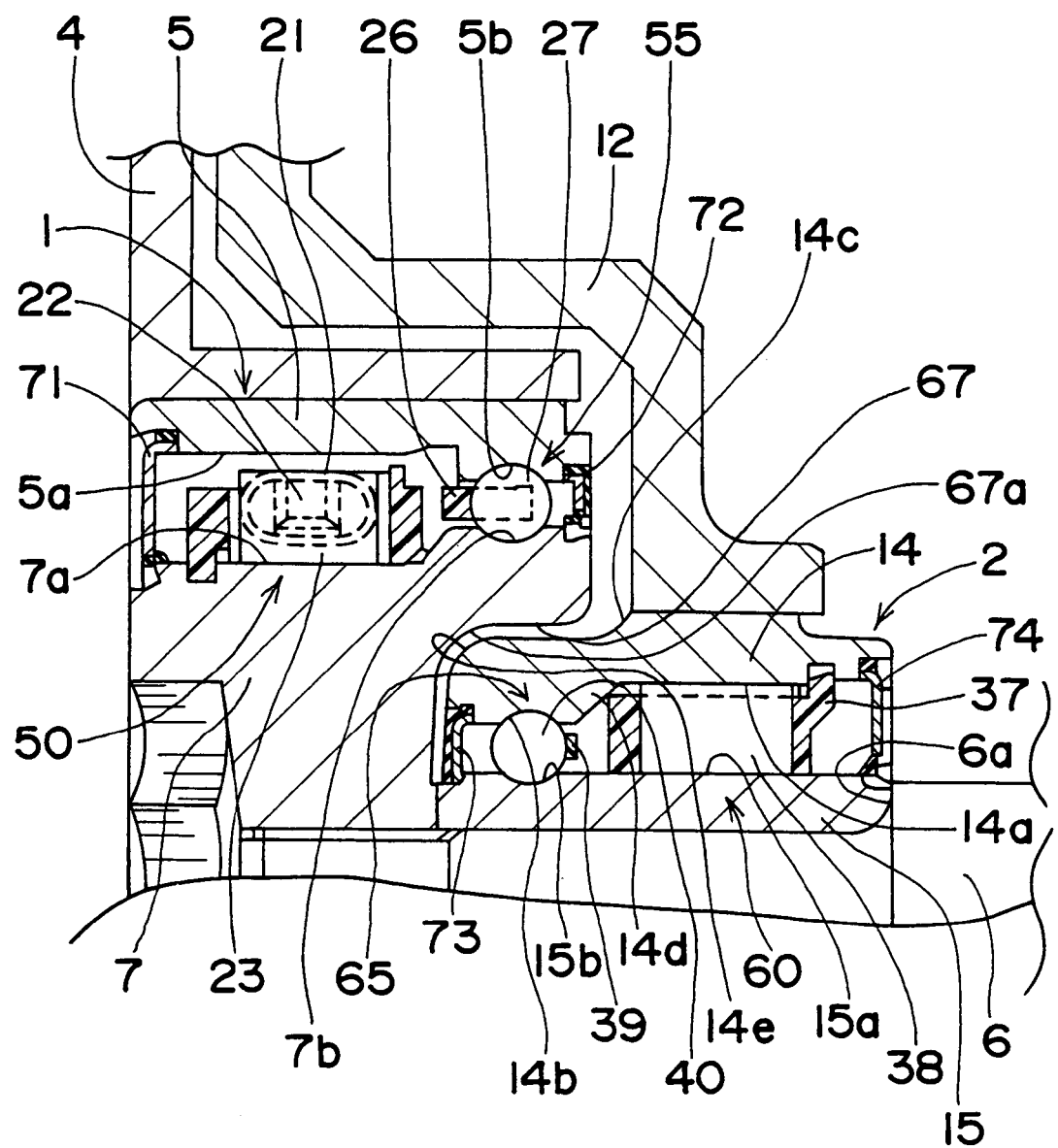
FIG. 2 is an enlarged view of part of the one-way clutch unit of FIG. 1.

As shown in FIG. 2, the first one-way clutch 1 includes a first outer ring 5 fixed to the first power transmission member 4, a first inner ring 7 fixed to the rotating shaft 6, first engagement rollers 23 as an example of first engagement members, retainer 22 and coil springs 21. A plurality of the engagement rollers 23 retained by the retainer 22 are circumferentially disposed at predetermined intervals between an engagement cylindrical surface 5a as an example of an engagement surface, which is formed on an inner periphery of the first outer ring 5, and an engagement cam-surface 7a as an example of an engagement surface, which is formed on an outer periphery of the first inner ring 7, so that the engagement rollers 23 are urged in one direction by the coil springs 21.

The engagement cylindrical surface 5a of the first outer ring 5, the engagement cam-surface 7a of the first inner ring 7, the coil springs 21, the retainer 22 and the engagement rollers 23 compose a one-way clutch portion 50 of the first one-way clutch 1.

The first one-way clutch 1 includes first balls 27 as an example of first rolling members and a retainer 26. The first balls 27 retained by the retainer 26 are circumferentially disposed at predetermined intervals between a raceway surface 5b with a circular arc shape in section, which is formed adjacent the engagement cylindrical surface 5a of the first outer ring 5 and a raceway surface 7b with a circular arc shape in cross section, which is formed adjacent the engagement cam-surface 7a of the first inner ring 7. The raceway surface 5b of the first outer ring 5, the raceway surface 7b of the first inner ring 7, the retainer 26 and the first balls 27 form a deep groove ball bearing portion 55.

In the first one-way clutch, an axially opened annular recess 67 is formed at an inner periphery in an end portion on the side of the raceway surface of the first inner ring 7 of the first one-way clutch 1. A curved surface 67a provides a connection between an end surface in the axial direction and a cylindrical surface of the annular recess 67.

On the other hand, the second one-way clutch 2 includes a second outer ring 14 fixed to the yoke 12 of the rotor 11, a second inner ring 15 fixed to the rotating shaft 6, second engagement rollers 38 as an example of second engagement members and a retainer 37. The engagement rollers 38 retained by the retainer 37 are disposed at predetermined intervals between an engagement cam-surface 14a as an example of an engagement surface, which is formed on an inner periphery of the second outer ring 14, and an engagement cylindrical surface 15a as an example of an engagement surface, which is formed on an outer periphery of the second inner ring 15, so that the engagement rollers 38 are urged in one direction by coil springs not shown.

The engagement cam-surface 14a of the second outer ring 14, the engagement cylindrical surface 15a of the second inner ring 15, the coil spring, the retainer 37 and the engagement rollers 38 compose a one-way clutch portion 60 of the second one-way clutch 2.

As shown in FIG. 2, the second one-way clutch 2 includes second balls 40 as an example of second rolling members and a retainer 39. The second balls 40 retained by the retainer 39 are circumferentially disposed at predetermined intervals between a raceway surface 14b with a circular arc shape 14b in section, which is formed adjacent the engagement cam-surface 14a of the second outer ring 14, and a raceway surface 15b with a circular arc shape in section, which is formed adjacent the engagement cylindrical surface 15a of the second inner ring 15. The raceway surface 14b of the second outer ring 14, the raceway surface 15b of the second inner ring 15, the retainer 39 and the second balls 40 compose a deep groove ball bearing portion 65.

An outer peripheral diameter on the side of the one-way clutch portion 60 is larger than that on the side of the deep groove ball bearing portion 65 of the second outer ring 14 of the second one-way clutch 2, and an outer peripheral surface of the second outer ring 14 is formed with a tapered surface 14c between the one-way clutch portion 60 and the deep groove ball bearing portion 65.

The outer diameter of the engagement cylindrical surface 15a of the second inner ring 15 of the second one-way clutch 2 is equal to a diameter of a shoulder portion of the raceway surface 15b of the second inner ring 15, and a diameter in a radial direction of the second engagement rollers 38 in section is larger than that of the second balls 40. This means that the diameter of an inscribed circle of the engagement cam-surface 14a of the second outer ring 14 is larger than the outer diameter of the raceway surface 14b of the second outer ring 14. Accordingly, a part 14d on the side of the deep groove ball bearing portion 65 of the second outer ring 14 is located at a position that is more inner in the radial direction than the inscribed circle of the engagement cam-surface 14a.

A curved surface 14e provides a connection between an end surface in the axial direction of the second outer ring 14 on the side of the deep groove ball bearing portion 65 of which the outer peripheral diameter is reduced, and an outer peripheral surface 80 on the side of the deep groove ball bearing portion 65 of the second outer ring 14. An end portion on the side of the deep groove ball bearing portion 65 of the second one-way clutch 2 is disposed within the annular recess 67 of the inner peripheral side of the first inner ring 7 of the first one-way clutch 1.

The inner ring 7 of the first one-way clutch 1 is screwed on a thread portion of the rotating shaft 6 so as to be fixed thereto. The second inner ring 15 is clamped and fixed by a bottom surface of the annular recess 67 of the first inner ring 7 and a step portion 6a of the rotating shaft 6. Reference numerals 71, 72, 73 and 74 denote seal members.

In the one-way clutch unit with the above construction, while the engine is in operation, a rotational power of the engine is transmitted to the pulley 3 shown in FIG. 1 via a belt that is not shown. The rotational power transmitted to the pulley 3 is then transmitted to the first outer ring 5 of the first one-way clutch 1 via the first power transmission member 4, so that the first outer ring 5 is rotated. Then, with the first engagement rollers 23 of the one-way clutch portion 50 of the first one-way clutch 1 engaged with the engagement cylindrical surface 5a of the first outer ring 5 and the engagement cam-surface 7a of the first inner ring 7 shown in FIG. 2, the first one-way clutch 1 is brought into an engaged state or on state. Consequently, the rotational power of the engine is transmitted from the first outer ring 5 to the first inner ring 7. Thereafter, the rotational power of the engine transmitted to the first inner ring 7 is transmitted to the rotating shaft 6, so that the compressor that is not shown is driven. While the engine is operating, the rotor 11 of the motor 10 is in a non-operational state, when the second engagement rollers 38 of the second one-way clutch 2 are in a loosely fitted state between the engagement cam-surface 14a of the stationary second outer ring 14 and the engagement cylindrical surface 15a of the second inner ring 15 rotating forward, namely, the second one-way clutch 2 is in a disengaged state or off state.

On the other hand, while the engine is stopped such as at the idling stop, the engine-driven pulley 3 is stopped, and the first engagement rollers 23 are brought into a loosely fitted state between the engagement cylindrical surface 5a of the first outer ring 5 that is stationary and the engagement cam-surface 7a of the first inner ring 7 that is rotating forward, namely, the first one-way clutch 1 is brought into a disengaged state. At this time, the motor 10 is driven to rotate the rotor 11. The rotational power of the rotor 11 is transmitted to the second outer ring 14 of the second one-way clutch 2, so that the second outer ring 14 is rotated in a forward direction. Then, with the second engagement rollers 38 of the one-way clutch portion 60 of the second one-way clutch 2 engaged with the engagement cam-surface 14a of the second outer ring 14 and the engagement cylindrical surface 15a of the second inner ring 15, the second one-way clutch 2 is brought into an engaged state. Consequently, the rotational power is transmitted from the second outer ring 14 to the second inner ring 15. Then, the rotational power of the rotor 11 transmitted to the second inner ring 15 is transmitted to the rotating shaft 6 and drives the compressor. While the individual one-way clutch portions 50, 60 of the first and second one-way clutches 1, 2 are in a disengaged state, the deep groove ball bearing portions 55, 65 of the first and second one-way clutches 1, 2 bear radial loads applied to the one-way clutches 1, 2, respectively, to thereby secure load resistance and durability of their respective one-way clutch portions 50, 60 of the one-way clutches 1, 2.

A power transmission device equipped with the one-way clutch unit of the above embodiment can drive the rotating shaft 6 of the compressor by using the two one-way clutches 1, 2 both while the engine is in operation and while the motor is driven (the engine is stopped). Therefore, unlike the conventional power transmission device, the power transmission device of the above embodiment does not require either electromagnetic clutch or control part for driving the rotating shaft 6 of the compressor. Therefore, the power transmission device can be made small in size and simple in structure.

According to the one-way clutch unit of the above embodiment, the end portion on the side of the deep groove ball bearing portion 65 of the second one-way clutch 2 is disposed in the annular recess 67 of the inner peripheral side of the first inner ring 7 of the first one-way clutch 1. Therefore, the dimension in the axial direction of the one-way clutch unit can be reduced by the dimension in the axial direction of the end portion of the one-way clutch 2 disposed in the annular recess 67. The end portion on the side of the deep groove ball bearing portion 65, which has an outer peripheral diameter that is smaller than that of the one-way clutch portion 60 of the second outer ring 14 in the second one-way clutch 2, is disposed within the annular recess 67 of the first inner ring 7 of the first one-way clutch 1. Thus, the inner diameter of the annular recess 67 of the first inner ring 7 can be reduced. Therefore, even if the outer peripheral diameter on the side of the deep groove ball bearing portion 55 of the first inner ring 7 is not increased, the thickness on the side of the deep groove ball bearing portion 55 of the first inner ring 7 can be secured. Therefore, there is no need for increasing the dimension in the radial direction of the first one-way clutch 1 and, as a result, the dimension in the radial direction of the one-way clutch unit can be reduced. In this manner, since the dimensions in both the axial and radial directions can be reduced, the one-way clutch unit can be made compact.

According to the one-way clutch unit of the above embodiment, the outer peripheral diameter on the side of the deep groove ball bearing portion 65 of the second outer ring 14 of the second one-way clutch 2 is set smaller than that on the side of the one-way clutch portion 60 of the second outer ring 14. Therefore, the thickness on the side of the deep groove ball bearing portion 65 of the second outer ring 14 of the second one-way clutch 2 can be made closer to that on the side of the one-way clutch portion 60 of the second outer ring 14. Therefore, when the second outer ring 14 is produced by cold forging, an enlargement in conical shape of an opening, which is attributable to a difference in thickness between the side of the deep groove ball bearing portion 65 and the side of the one-way clutch portion 60 of the second outer ring 14, is not formed on the side of the one-way clutch portion 60, so that the engagement performance of the second one-way clutch 2 does not deteriorate. If the outer peripheral diameter on the side of the raceway surface, namely on the side of the deep groove ball bearing portion 65 of the second outer ring 14 is set equal to that on the side of the engagement surface, namely on the side of the one-way clutch portion 60 of the second outer ring 14, the thickness on the side of the engagement surface of the second outer ring 14 is smaller than that on the side of the raceway surface of the second outer ring 14. Consequently, there occurs an expansion in conical shape of an opening on the side of the engagement surface of the second outer ring 14 when the second outer ring 14 is produced by cold forging, so that the engagement performance of the second one-way clutch 2 deteriorates.

According to the one-way clutch unit of the above embodiment, the engagement cylindrical surface 5a is formed on the inner periphery of the first outer ring 5 of the first one-way clutch 1, and the engagement cam-surface 7a is formed on the outer periphery of the first inner ring 7 so that the first one-way clutch 1 is made a so-called inner cam system. Alternatively, the engagement cam-surface may be formed on the inner periphery of the first outer ring 5 of the first one-way clutch 1, and the engagement cylindrical surface may be formed on the outer periphery of the first inner ring 7 so that first one-way clutch 1 is made a so-called outer cam system. Similarly, according to the one-way clutch unit of the above embodiment, the second one-way clutch 2 is made the outer cam system. Alternatively, the second one-way clutch may also be made the inner cam system.

According to the one-way clutch unit of the above embodiment, the annular recess 67 in which the end portion on the side of the deep groove ball bearing portion 65 of the second one-way clutch 2 is disposed is formed at the end portion on the side of the raceway surface 55 in the inner periphery of the first inner ring 7 of the first one-way clutch 1. Alternatively, the annular recess in which the end portion on the side of the deep groove ball bearing portion 65 of the second one-way clutch 2 is disposed may be formed at the end portion on the side of the one-way clutch portion in the inner periphery of the first inner ring of the first one-way clutch.

In the one-way clutch unit of the above embodiment, the first and second one-way clutches 1, 2 are respectively constructed of the one-way clutch portions 50, 60 and the deep groove ball bearing portions 55, 65. An angular ball bearing portion or a four-point contact ball bearing portion may be adopted in place of the deep groove ball bearing portion. Further, the bearing portion disposed adjacent the one-way clutch portion may be constructed of a roller bearing portion such as a cylindrical roller bearing portion or a conical roller bearing portion.

In the one-way clutch unit of the above embodiment, the first and second engagement rollers are used as the first and second engagement members. Alternatively, other engagement members such as sprags and so on may also be used as the first or second engagement members.

As is apparent from the above, since the one-way clutch unit of the present invention comprises the first and second one-way clutches, the structure of the device that performs power transmission in two systems can be made simple in structure and small in size.

Furthermore, in the one-way clutch unit of the above embodiment, the outer peripheral diameter on the side of the raceway surface is set smaller than that on the side of the engagement surface of the outer ring. Accordingly, it is possible to prevent the occurrence of an enlargement in conical shape of an opening at the end portion on the side of the engagement surface of the outer ring when the outer ring is produced by cold forging.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A one-way clutch unit comprising:
   a first one-way clutch including a first outer ring having in an inner periphery thereof an engagement surface and a raceway surface which are adjacent to each other, a first inner ring having in an outer periphery thereof an engagement surface and a raceway surface which are adjacent to each other, first engagement members disposed between the engagement surface of the first outer ring and the engagement surface of the first inner ring, and first rolling members disposed between the raceway surface of the first outer ring and the raceway surface of the first inner ring; and
   a second one-way clutch including a second outer ring having in an inner periphery thereof an engagement surface and a raceway surface which are adjacent to each other, a second inner ring having in an outer periphery thereof an engagement surface and a raceway surface which are adjacent to each other, second engagement members disposed between the engagement surface of the second outer ring and the engagement surface of the second inner ring, and second rolling members disposed between the raceway surface of the second outer ring and the raceway surface of the second inner ring; wherein
   an outer diameter of a portion on a side of the raceway surface in an outer peripheral surface of the second outer ring of the second one-way clutch is smaller than an outer diameter of a portion on a side of the engagement surface in the outer peripheral surface of the second outer ring; wherein
   an annular recess is provided in an inner periphery of the first inner ring of the first one-way clutch; and wherein
   one end portion on the side of the raceway surface in the second one-way clutch is disposed in the annular recess.

* * * * *